3,133,931
ESTERS
Charles Ferdinand Huebner, Chatham, N.J., assignor to Ciba Corporation, New York, N.Y., a corporation of Delaware
No Drawing. Filed Feb. 28, 1962, Ser. No. 176,400
12 Claims. (Cl. 260—295)

The present invention concerns benzocycloalkane compounds, which contain in the cycloalkane portion from five to seven ring members. More especially, the invention relates to compounds of the formula:

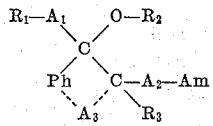

in which Ph stands for a 1,2-phenylene (o-phenylene) radical, $R_1$ represents a monocyclic, azacyclic aryl radical, $R_2$ represents the acyl radical, of an organic carboxylic acid, $R_3$ stands for hydrogen or lower alkyl, Am represents a tertiary amino group, and each of the groups $A_1$, $A_2$ and $A_3$ stands for a lower alkylene radical, salts, N-oxides, salts of N-oxide or quaternary ammonium compounds thereof, as well as process for the preparation of such compounds.

The 1,2-phenylene radical may be unsubstituted or contain one or more than one of the same or of different substituents attached to any of the four positions available for substitution. Substituents are, for example, lower alkyl, e.g. methyl, ethyl, n-propyl, isopropyl and the like, hydroxyl, etherified hydroxyl, such as lower alkoxy, e.g. methoxy, ethoxy, n-propyloxy, isopropyloxy and the like, halogeno, e.g. fluoro, chloro, bromo and the like, trifluoromethyl, or any other suitable substituent. The group Ph in the above formula stands, therefore, for 1,2-phenylene, lower alkyl-1,2-phenylene, hydroxy-1,2-phenylene, lower alkoxy-1,2-phenylene, halogeno-1,2-phenylene, trifluoromethyl-1,2-phenylene and the like.

The monocyclic azacyclic aryl group $R_1$ is primarily pyridyl, above all 2-pyridyl, as well as 4-pyridyl and the like, or a substituted pyridyl radical, which has lower alkyl, e.g. methyl, ethyl, n-propyl, isopropyl and the like, halogeno, e.g. fluoro, chloro, bromo and the like, lower alkoxy, e.g. methoxy, ethoxy and the like, or any other suitable group as substituents, and may be represented by lower alkyl-pyridyl, halogeno-pyridyl, lower alkoxy-pyridyl and the like. Other monocyclic azacyclic aryl radicals are, for example, 3-pyridazinyl, 4-pyridazinyl, 2-pyrimidyl, 4-pyrimidyl, 5-pyrimidyl, 2-pyrazinyl and the like.

The group $R_2$ represents the acyl radical of an organic carboxylic acid, such as an aliphatic carboxylic acid, above all a lower alkanoic acid, especially acetic or propionic acid, as well as butyric, pivalic, 2,2-dimethyl-butyric acid and the like. Other suitable aliphatic carboxylic acids furnishing the acyl radical are lower alkyl-carbonic acids, e.g. methyl-carbonic, ethyl-carbonic acid and the like, carbamic acids, such as carbamic acid, N-lower alkyl-carbamic acids, e.g. N-methyl-carbamic, N-ethyl-carbamic acid and the like, N,N-di-lower alkyl-carbamic acids, e.g. N,N-dimethyl-carbamic, N,N-diethyl-carbamic acid and the like, tertiary amino-lower alkanoic acids, e.g. N,N-dimethylamino-acetic, N,N-diethyl-amino-acetic, pyrrolidino-acetic, β-N,N-dimethylamino-propionic acid and the like, lower alkoxy-lower alkanoic acids, e.g. methoxy-acetic, ethoxy-acetic, β-methoxy-propionic acid and the like, or any other suitable aliphatic carboxylic acid, as well as other organic carboxylic acids, such as benzoic acid, lower alkoxy-benzoic acids, e.g. 4-methoxy-benzoic, 3,4,5-trimethoxy-benzoic acid and the like, piperonylic acid, phenylacetic acid, cinnamic acid, pyridine carboxylic acids, e.g. 4-pyridine carboxylic acid and the like, or any other suitable organic carboxylic acid.

The group $R_3$ represents primarily hydrogen, but may also stand for lower alkyl, e.g. methyl, ethyl, n-propyl, isopropyl, n-butyl and the like.

The tertiary amino group Am is represented, for example, by N,N-di-substituted amino, in which the substituents of the amino group represent, for example, lower alkyl, lower alkenyl, cycloalkyl, cycloalkyl-lower alkyl, monocyclic carbocyclic aryl, monocyclic carbocyclic aryl-lower alkyl and the like. Such substituents have from one to ten carbon atoms, and are represented, especially, by lower alkyl, e.g. methyl, ethyl, propyl, isopropyl, butyl, isobutyl, secondary butyl, pentyl, neopentyl and the like, as well as lower alkenyl, e.g. allyl, methylallyl and the like, cycloalkyl, having from three to eight, preferably from five to seven, ring carbon atoms, e.g. cyclopentyl, cyclohexyl and the like, cycloalkyl-lower alkyl, in which cycloalkyl has from three to eight, preferably from five to seven, ring carbon atoms, e.g. cyclopentyl-methyl, 2-cyclohexyethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like. N,N-di-substituted amino groups are primarily N,N-di-lower alkyl-amino, in which lower alkyl has from one to four carbon atoms, e.g. N,N-dimethylamino, N-methyl-N-ethylamino, N,N-diethylamino, N,N-di-n-propylamino, N,N-di-isopropylamino and the like, as well as by N-cycloalkyl-N-lower alkylamino, in which cycloalkyl has preferably from five to seven ring carbon atoms, and lower alkyl has from one to four carbon atoms, e.g. N-cyclopentyl-N-methyl-amino, N-cyclohexyl-N-methyl-amino, N-cyclohexyl-N-ethyl-amino and the like, N-lower alkyl-N-phenyl-lower alkyl-amino, in which lower alkyl has from one to four carbon atoms, e.g. N-benzyl-N-methyl-amino, N-benzyl-N-ethyl-amino, N-methyl-N-(1-phenylethyl)-amino, N-methyl-N-(2-phenylethyl)-amino and the like, or any other equivalent N,N-di-substituted amino group. A substituent in an N,N-di-substituted amino radical, particularly a lower alkyl substituent, may also have functional groups, such as hydroxyl, lower alkoxy, e.g. methoxy, ethoxy and the like, lower alkyl-mercapto, e.g. methylmercapto, ethylmercapto and the like, or any other suitable group as a substituent. N,N-di-substituted amino groups, in which the substituents may carry functional groups are, for example, N-hydroxy-lower alkyl-N-lower alkyl-amino, e.g. N-(2-hydroxy-ethyl)-N-methyl-amino and the like, N,N-di-hydroxy-lower alkyl-amino, e.g. N,N-di-(2-hydroxy-ethyl)-amino and the like.

The tertiary amino group Am may also be represented by 1-N,N-alkylene-imino, in which alkylene has from four to eight carbon atoms, or by 1-N,N-aza-alkylene-imino groups, in which alkylene has from four to six carbon atoms, as well as by 1-N,N-oxa-alkylene-imino and by 1-N,N-thia-alkylene-imino, in which alkylene has preferably four carbon atoms. Together with the imino-nitrogen atom, such alkylene, aza-alkylene, oxa-alkylene or thia-alkylene radicals represent primarily 1-N,N-alkylene-imino, in which alkylene has from four to eight carbon atoms, such as 1-pyrrolidino radicals, especially 1-pyrrolidino, as well as 2-methyl-1-pyrrolidino and the like, 1-piperidino radicals, particularly 1-piperidino, as well as 2-methyl-1-piperidino, 4-methyl-1-piperidino, 3-hydroxy-1-piperidino, 3-acetoxy-1-piperidino, 3-hydroxymethyl-1-piperidino and the like, 1 - N,N - 1,6-hexylene-imino, 1-N,N-1,7-heptylene-imino and the like, as well as 1-N,N-(aza-alkylene)-imino, in which alkylene has from four to six carbon atoms, particularly 1-N,N-(N- lower alkyl-aza-alkylene)-imino, in which alkylene has from four to six carbon atoms, such as 1-piperazino, and particularly 4-lower alkyl-1-piperazino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-(4-aza-1,7-heptamethylene)-imino, particularly 1 - N,N - (4-aza-4-lower alkyl-1,7-heptamethylene)-imino, e.g. 1 - N,N - (4-aza-4-methyl-1,7-heptamethylene)-imino and the like, 4-morpholino, 4-thiamorpholino and the like.

The lower alkylene group $A_1$ represents an alkylene radical having from one to four, preferably from one to two, carbon atoms and is represented above all by methylene, as well as be 1,1-ethylene, 1,2-ethylene, 1-methyl-1,2-ethylene, 2-methyl-1,2-ethylene, 1,1-propylene, 2,2-propylene, 1,3-propylene and the like.

The lower alkylene radical $A_2$ carrying the tertiary amimo group Am has from one to three carbon atoms; it represents especially methylene, but may also stand for 1,1-ethylene, 1,2-ethylene, 1-methyl-1,2-ethylene, 2-methyl-1,2-ethylene, 2,2-propylene, 1,3-propylene and the like. The group $A_2$ may also be part of a ring system, in which the tertiary amino group Am is a ring member. Thus, the tertiary amino-lower alkyl group represented by the group —$A_2$—Am in the above formula may also be a heterocyclic or a heterocyclic-lower alkyl radical, in which the tertiary amino group is part of a heterocyclic nucleus. A heterocyclic ring system of this type may be connected through one of its ring carbon atoms or through a lower alkylene radical, e.g. methylene, 1,2-ethylene and the like, with the 2-position of the benzocycloalkane ring. Such radicals are represented, for example, by 1-methyl-3-pyrrolidlmethyl, 1-methyl-3-piperidylmethyl, 1-methyl-4-piperidyl and the like.

The lower alkylene radical $A_3$ has from one to four, preferably two, carbon atoms and stands primarily, for 1,2-ethylene, as well as methylene, 1,1-ethylene, 1-methyl-1,2-ethylene, 2-methyl-1,2-ethylene, 1,3-propylene, or 2,3-butylene, 1,3-butylene and the like.

Salts of the compounds of this invention are primarily pharmaceutically acceptable, non-toxic acid addition salts with inorganic acids, e.g. hydrochloric, hydrobromic, nitric, sulfuric, phosphoric acids and the like, organic acids, such as organic carboxylic acid, e.g. acetic, propionic, pivalic, malonic, succinic, maleic, malic, tartaric, citric, salicylic, 2-acetoxybenzoic, nicotinic, isonicotinic acid and the like, or organic sulfonic acids, e.g. methane sulfonic, ethane sulfonic, ethane 1,2-disulfonic, 2-hydroxyethane sulfonic, p-toluene sulfonic acid and the like, or any suitable acid. Salts, which are prepared primarily for identification purpose, are, for example, those with acidic organic nitro compounds, e.g. picric, picrolonic, flavianic acid and the like, or metal complex acids, e.g. phosphotungstic, phosphomolybdic, chloroplatinic, Reinecke acid and the like. Mono- or poly-salts may be formed depending on the number of salt-forming groups present in the molecule and/or the conditions used for the salt formation.

Also included within the scope of the present invention are the N-oxides of the aforementioned compounds, as well as the pharmaceutically acceptable, non-toxic acid addition salts of such N-oxides.

Quaternary ammonium compounds of the compounds of this invention may be either mono- or poly-quaternary ammonium compounds depending on the conditions of the quaternization reaction and/or the number of tertiary amino groups present in the molecule. Quaternary ammonium compounds are particularly those with reactive halides, sulfates or sulfonates, such as lower alkyl halides, e.g. methyl, ethyl, n-propyl or isopropyl chloride, bromide, iodide and the like, phenyl-lower alkyl halides, e.g. benzyl, 1-phenylethyl or 2-phenylethyl chloride, bromide or iodide and the like, di-lower alkyl sulfates, e.g. dimethyl sulfate, diethyl sulfate and the like, lower alkyl lower alkane sulfonates, e.g. ethyl or methyl methane sulfonate, ethane sulfonate, lower alkyl hydroxy-lower alkane sulfonates, e.g. methyl 2-hydroxy-ethane sulfonate and the like, lower alkyl monocyclic carbocyclic aryl sulfonates, e.g. methyl p-toluene sulfonate, ethyl p-toluene sulfonate and the like. Also included as quaternary ammonium compounds are the corresponding quaternary ammonium hydroxides, and the salts of such hydroxides with acids, particularly with the organic carboxylic acids mentioned hereinabove.

Depending on the number of asymmetric carbon atoms, present in the molecule, the compounds of this invention may be obtained as mixtures of racemates, racemates or antipodes, the separation and resolution of which will be discussed and illustrated hereinbelow.

The compounds of this invention have outstanding analgesic properties, and can, therefore, be used to raise the threshold of pain and alleviate light acute pain, for example, headache and the like, severe acute pain, for example, in connection with surgery and the like, or chronic pain, as in bursitis, arthritis and the like.

Compounds with particularly outstanding analgesic properties are those of the formula:

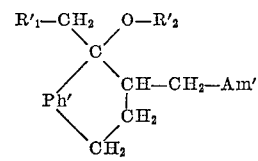

in which $R_1'$ stands for pyridyl, particularly 2-pyridyl, as well as 4-pyridyl, $R_2'$ represents the acyl radical of a lower alkanoic acid having from two to six, especially from two to three, carbon atoms, e.g. acetic acid or propionic acid, as well as butyric, pivalic, 2,2-dimethylbutyric acid and the like, Am' is above all N,N-di-lower alkyl-amino, in which lower alkyl has from one to four, especially from one to two, carbon atoms, e.g. N,N-dimethyl-amino, N-ethyl-N-methyl-amino or N,N-diethyl-amino, as well as N,N-di-n-propylamino and the like, as well as N,N-alkylene-imino, in which alkylene has from four to six carbon atoms, e.g. 1-pyrrolidino, 1-piperidino, 1-N,N-1,6-hexylene-imino and the like, and Ph' represents above all 1,2-phenylene, as well as hydroxy-1,2-phenylene, lower alkoxy-1,2-phenylene or halogeno-1,2-phenylene and the like, or the pharmaceutically acceptable, non-toxic acid addition salts thereof. These compounds are represented by 2-N,N-di-lower alkyl-amino-methyl-1-lower alkanoyloxy-1-(pyridyl-methyl) - 1,2,3,4-tetra-hydro-naphthalenes in which pyridyl is primarily 2-pyridyl, as well as 4-pyridyl, lower alkanoyl has from two to five, particularly from two to three carbon atoms, and lower alkyl has from one to four, especially from one to two carbon atoms, and the pharmaceutically acceptable, non-toxic acid addition salts thereof.

The compounds of this invention may be used in the form of pharmaceutical preparations for enteral or parenteral use, which contain the new compounds in admixture with a pharmaceutical organic or inorganic, solid or liquid vehicle. For making up the preparations there may be used substances, which do not react with the active ingredient, such as water, gelatine, lactose, starches, lactic acid, stearic acid, magnesium stearate, stearyl alcohol, talc, vegetable oils, benzyl alcohols, gums, propylene glycol, polyalkylene glycols, or any other known carrier for pharmaceutical preparations. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other useful substances.

The compounds of the present invention may be prepared according to methods known per se, for example, by converting in a compound of the formula:

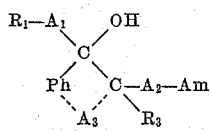

in which Ph, $R_1$, $R_3$, Am, $A_1$, $A_2$ and $A_3$ have the previously given meaning, the hydroxyl group of the formula —OH into an esterified hydroxyl group of the formula —O—$R_2$, in which $R_2$ has the previously given meaning, and, if desired, converting a resulting salt into the free compound or into another salt, and/or, if desired, converting a resulting compound into an N-oxide or a quaternary ammonium compound thereof, and/or, if desired, converting a resulting compound or an N-oxide into a salt thereof, and/or, if desired, converting a quaternary ammonium compound into another quaternary ammonium compound, and/or, if desired, separating a mixture of isomers into the single isomers.

The conversion of the free hydroxyl group into an esterified hydroxyl group is carried out according to known esterification methods, preferably by treating the starting material with the reactive derivative of an organic carboxylic acid having the formula $R_2$—COOH, in which $R_2$ has the previously given meaning. A reactive functional derivative of an organic carboxylic acid capable of forming an ester grouping is an acid halide, particularly the chloride, or the anhydride of such acid.

Esterification with an organic acid halide is performed in the presence of an inert diluent, and in the absence or in the presence of a base, particularly an organic base, for example, such as a N,N,N-tri-lower alkyl-amine, e.g. N,N,N - trimethylamine, N,N - dimethyl - N-ethylamine, N,N,N-triethylamine, or any other suitable amine, or a heterocyclic base, e.g. pyridine, collidine, or any other equivalent compound. The liquid organic bases may simultaneously serve as solvents; other inert diluents, such as, for example, aromatic hydrocarbons, e.g. benzene, toluene, xylene and the like, aliphatic hydrocarbons, e.g. pentane, hexane and the like, or ethers, e.g. diethyl ether, tetrahydrofuran and the like, may also serve as diluents.

An acid anhydride used as the esterification reagent is preferably used in the presence of a tertiary amine, or particularly, a heterocyclic base, e.g. pyridine and the like, as well as in the presence of an acid, for example, sulfuric, perchloric acid and the like, the acid being used in catalytic amounts.

Ketenes are also useful as esterification reagents; these compounds are represented, for example, by ketene itself, methylketene or other substituted ketenes, which furnish an acetyl, a propionyl radical or any other substituted acetyl radicals. The reaction with a ketene is performed in an inert solvent, such as an aromatic hydrocarbon, e.g. toluene and the like.

The esterification reaction may be performed while cooling, at room temperature or at an elevated temperature. If necessary, the atmosphere of an inert gas, e.g. nitrogen, may be required.

The starting materials used in the above reaction are new and are intended to be included within the scope of the invention; they may be prepared, for example, by reacting a compound of the formula:

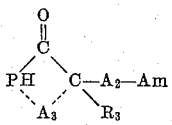

in which Ph, $R_3$, Am, $A_2$ and $A_3$ have the previously given meaning, with an $R_1$-$A_1$-alkali metal compound or an $R_1$-$A_1$-Grignard reagent, in which $R_1$ and $A_1$ have the previously given meaning, and, if desired, separating a mixture of isomers into the single isomers.

An $R_1$-$A_1$-alkali metal compound is more especially an $R_1$-$A_1$-lithium, e.g. a picoline lithium compound as well as an $R_1$-$A_1$-sodium compound, which may be prepared according to known methods. The reaction of such reagent, particularly of a pyridyl-lower alkyl lithium, e.g. a picoline lithium and the like, reagent, with the ketone intermediate is preferably carried out in the presence of an inert diluent, such as, for example, an ether, e.g. diethylether, tetrahydrofuran and the like, an aromatic hydrocarbon, e.g. benzene, toluene and the like, or any other suitable solvent. Cooling may be required, but the reaction may be performed at room temperature, or, if necessary, at an elevated temperature, and, advantageously, in the atmosphere of an inert gas, e.g. nitrogen.

An $R_1$-$A_1$-Grignard reagent is reacted with the ketone compound under analogous conditions; suitable reagents are particularly the compounds of the formula $$R_1—A_1—MgHal$$

in which Hal stands for halogeno, e.g. $R_1$-$A_1$-MgCl, $R_1$-$A_1$-MgBr and the like. A resulting Grignard complex is decomposed, for example, with water, or preferably with aqueous solutions of ammonium salts, e.g. ammonium chloride and the like.

Especially useful as intermediates are the compounds of the formula:

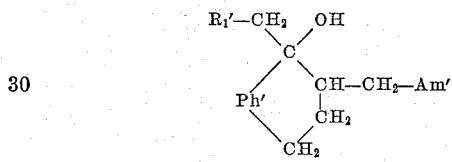

in which $R_1$, Am′ and Ph′ have the previously given meaning. These compounds are represented by 2-N,N-di-lower alkyl - amino - methyl-1-(pyridyl-methyl)-1,2,3,4-tetrahydro-naphthalen-1-ols, in which pyridyl represents primarily 2-pyridyl, as well as 4-pyridyl, and lower alkyl has from one to four, especially from one to two, carbon atoms.

The intermediates used in the preparation of the starting materials are known or may be prepared according to the methods used for the known compounds. For example, compounds of the above formula, in which the alkylene group $A_2$ stands for methylene, may be prepared according to the Mannich reaction, which is performed by treating a ketone lacking the group —$A_2$—Am adjacent to the ketone group, with a secondary amine in the presence of formaldehyde or a formaldehyde furnishing reagent in an inert solvent. Ketones, in which $A_2$ has more than one carbon atom, may be prepared, for example by forming the anion of the ketone and reacting it with a reactive ester of an alcohol of the formula HO—$A_2$—Am, such as a compound of the formula Hal—$A_2$—Am, in which Hal stands for halogeno, particularly chloro.

A resulting salt may be converted into the free compound, for example, by treatment with an alkaline reagent, such as an alkali metal hydroxide, e.g. lithium hydroxide, sodium hydroxide, potassium hydroxide and the like, an alkali metal carbonate, e.g. sodium or potassium carbonate or hydrogen carbonate and the like, ammonia, or any other suitable alkaline reagents, as well as hydroxyl ion exchange preparation and the like.

A resulting salt may also be converted into another salt, for example, by treatment with a proper metal salt of an acid, e.g. silver chloride, sodium maleate and the like, in a suitable solvent, or with an anion exchange preparation.

A free base may be converted into its acid addition salts by reacting it with an acid, for example, by treating the free base or a solution thereof with the acid and isolating the desired salt, which may contain water or solvent of crystallization. Mono-or poly-salts may be obtained depending on the conditions of the reaction and/or the number of salt-forming amino groups.

The N-oxide of a compound may be prepared, for example, by treating a solution of it with an N-oxidizing reagent, such as, for example, ozone, hydrogen peroxide, an inorganic peracid, e.g. persulfuric acid and the like, an organic persulfonic acid, e.g. p-toluene persulfonic acid and the like, or primarily an organic percarboxylic acid, e.g. peracetic, perbenzoic, monoperphthalic acid and the like. The desired N-oxide may be obtained in the form of the free base or an acid addition salt thereof; the N-oxide free base may be converted into an acid addition salt or the N-oxide salt may be converted into the free bases according to the previously described procedures. Mono- or poly-N-oxides may be obtained depending on condition of the reaction and the number of N-oxide-forming amino groups present in the molecule.

The quaternary ammonium compounds of the compounds of this invention may be obtained, for example, by reacting the tertiary base with a reactive ester formed by a hydroxylated compound and a strong inorganic or organic acid. Reactive esters are more especially the lower alkyl halides, phenyl-lower alkyl halides, di-lower alkyl sulfates and lower alkyl sulfonates previously mentioned; the quaternizing reaction may be performed in the absence or presence of an inert solvent, and while cooling, at room temperature or at an elevated temperature, if necessary, in a closed vessel under pressure, and/or in the atmosphere of an inert gas, e.g. nitrogen.

A resulting quaternary ammonium compound may be converted into another quaternary ammonium compound, such as the corresponding quaternary ammonium hydroxide, for example, by reacting a quaternary ammonium halide with silver oxide, a quaternary ammonium sulfate with barium hydroxide, or a quaternary ammonium salt with a hydroxyl ion exchange preparation, or by electrodialysis or any other suitable procedure. A resulting quaternary ammonium hydroxide may be converted into a quaternary ammonium salt by reacting the base with an acid. A quaternary ammonium salt may also be converted directly into another quaternary ammonium salt without the formation of a quaternary ammonium hydroxide; for example, a quaternary ammonium iodide may be reacted with freshly prepared silver chloride or hydrochloric acid in methanol to yield the quaternary ammonium chloride. Quaternary ammonium compounds may contain water or solvent of crystallization, and, depending on the conditions used for their formation and/or the number of quaternary ammonium derivatives-forming amino groups present in the molecule, mono- or poly-quaternary ammonium compounds may be obtained.

Resulting mixtures of isomers may be separated into single isomers. Thus, a mixture of racemates may be separated into individual racemic compounds using known methods, which utilize, for example, physico-chemical differences between the racemates, such as solubility and the like; thus, mixtures of racemates may be separated by fractional crystallization, if necessary, by using a derivative, e.g. a salt or a quaternary ammonium compound, of the mixture of racemates, by fractional distillation and the like. Racemates may be resolved into the optically active forms, the levo-rotatory l-form and the dextro-rotatory d-form according to known resolution methods. For example, to a solution of the free base of a racemate (a d,l-compound) in a suitable solvent or solvent mixture is added the optically active form of an acid having an asymmetric center. Such acids are the d-tartaric acid (L-tartaric acid) and the l-tartaric acid (D-tartaric acid); the optically active forms of di-benzoyl-tartaric, di-p-toluyl-tartaric, malic, mandelic, camphor 10-sulfonic, quinic acid and the like, may also be used. Salts formed by one of the optically active forms of the base with the optically active forms of the acid may then be isolated on the basis of their different solubilities. The free and optically active base may be liberated from a resulting salt, and, if desired, be converted into an acid addition salt, an N-oxide, a salt of an N-oxide or a quaternary ammonium compound according to the previously described methods.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the specification as the preferred embodiments of the invention.

This is a continuation-in-part application of my application Serial No. 120,937, filed June 30, 1961.

The following examples are intended to illustrate the invention and are not to be construed as being limitations thereon. Temperatures are given in degrees centigrade.

*Example 1*

A solution of phenyl lithium in 200 ml. of diethyl ether is prepared from 1.75 g. of lithium and 14 ml. of bromobenzene in an atmosphere of dry nitrogen according to the method described by Evans et al., Organic Syntheses, Coll. vol. II, p. 518 (Wiley 1943). To this solution are added slowly 12.5 ml. of dry α-picoline in 50 ml. of anhydrous diethyl ether and, after several hours of standing, dropwise a solution of 17 g. of 2-N,N - dimethylaminomethyl-1,2,3,4-tetrahydro-naphthalen-1-one in 50 ml. of diethyl ether.

After standing for thirty minutes, the solution containing the 2 - N,N-dimethylaminomethyl-1-(2-pyridylmethyl)-1,2,3,4-tetrahydro-naphthalen-1-ol of the formula:

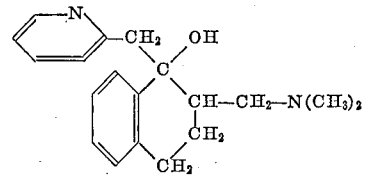

is treated dropwise with a solution of 14 ml. of propionic acid anhydride in 50 ml. of diethyl ether. The reaction mixture is stirred for six hours, the precipitate is filtered off, washed several times with diethyl ether, dried overnight, and then suspended in 100 ml. of water. The aqueous suspension is made acidic with hydrochloric acid to bring the basic material into solution, the mixture is extracted with diethyl ether, and the aqueous solution is separated and made basic with aqueous ammonia. The resulting oil is extracted with diethyl ether, and the solvent is removed under reduced pressure. The resulting oily residue partly crystallizes; the crystalline material is collected, freed from the oil by carefully washing it with a small amount of cold diethyl ether. The desired 2-N,N-dimethylaminomethyl-1-propionyloxy-1-(2-pyridylmethyl)-1,2,3,4-tetrahydro - naphthalene of the formula:

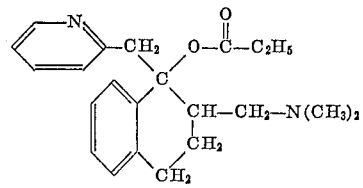

is recrystallized from ethanol, M.P. 110°.

*Example 2*

A solution of 3.3 g. of maleic acid in 10 ml. of acetone is added to a solution of 10 g. of 2-N,N-dimethylamino-methyl - 1 - propionyloxy - 1 - (2-pyridylmethyl)-1,2,3,4-tetrahydro-naphthalene in 20 ml. of acetone; the crystalline 2-N,N-dimethylaminomethyl-1-propionyloxy-1-(2-pyridylmethyl)-1,2,3,4-tetrahydro-naphthalene maleate precipitates and is recrystallized from a mixture of ethanol and diethyl ether, M.P. 146–150°.

*Example 3*

To the α-picoline lithium reagent prepared from 1.93 g. of lithium, 14.45 ml. of bromobenzene and 12.5 ml. of α-picoline ring diethyl ether as the solvent according to the procedure described in Example 1, is added 2-N,N-dimethylaminomethyl - 1,2,3,4-tetrahydro-naphthalen-1-one (liberated from 20.0 g. of the hydrochloride salt by treatment with base). The reaction mixture is allowed to stand overnight at room temperature and then diluted with 200 ml. of tetrahydrofuran. The diethyl ether is evaporated from the mixture containing the desired 2-N,N - dimethylaminomethyl-1-(2-pyridylmethyl)-1,2,3,4-tetrahydro-naphthalen-1-ol, to which is added 10.4 ml. of acetic anhydride. After refluxing for three hours, the reaction mixture is concentrated to dryness, and the residue is dissolved in a mixture of 15 percent hydrochloric acid and ice. The resulting solution is extracted with diethyl ether, the aqueous phase is made basic with ammonium hydroxide and extracted with diethyl ether; the organic extracts are washed with water, dried over sodium sulfate and evaporated to dryness to yield the oily 1-acetyloxy-2 - N,N-dimethylaminomethyl-1-(2-pyridylmethyl)-1,2,3,4-tetrahydro-naphthalene of the formula

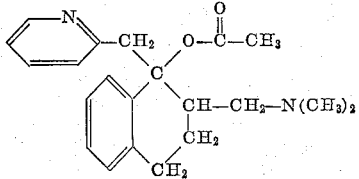

Other compounds, which may be prepared according to the above procedure using the appropriate starting materials, are for example, 2-N,N-dimethylamino-1-(2-pyridylmethyl) - 1 - propionyloxy-indane, 1-acetyloxy-2-(1-piperidino) - methyl-1-(2-pyridylmethyl)-indane, 2-(2-N,N-dimethylaminoethyl) - 1 - (4 - pyridylmethyl)-1-propionyloxy-indane, 1-acetyloxy - 2 - N,N - diethylaminomethyl-1-(2-pyridylmethyl) - 1,2,3,4 - tetrahydro - naphthalene, 2 - N,N - dimethylaminomethyl-1-propionyloxy-1-(4-pyridylmethyl)-1,2,3,4-tetrahydro-naphthalene, 2-N,N-dimethylaminomethyl - 1 - propionyloxy-1-(4-pyridylmethyl)-1,2,3,4-tetrahydro-naphthalene, 2-(2-N,N-diethylaminoethyl) - 1 - pivaloyloxy-1-[1-(2-pyridyl)-ethyl]-1,2,3,4-tetrahydro-naphthalene, 1 - ethoxycarbonyloxy-2-[2-(4-morpholino)-ethyl] - 1 - (2 - pyridylmethyl)-1,2,3,4-tetrahydro - naphthalene, 2-N,N-dimethylaminomethyl-6-chloro - 1 - propionyloxy-1-(2-pyridylmethyl)-1,2,3,4-tetrahydro - naphthalene, 1-acetyloxy-2-N,N-dimethylaminomethyl-6-methoxy - 1 - (2 - pyridylmethyl)-1,2,3,4-tetrahydro - naphthalene, 1-acetyloxy-2-N,N-dimethylaminomethyl - 1 - (2-pyridylmethyl)-benzosuberane, 1-propionyloxy - 2 - (1-pyrrolidino)-methyl-1-(2-pyridylmethyl)-benzosuberane and the like.

*Example 4*

To an acetone solution of 2.0 g. of 1-acetyloxy-2-N,N-dimethylaminomethyl - 1 - (2-pyridylmethyl)-1,2,3,4-tetrahydro-naphthalene is added an equivalent amount of maleic acid; the desired 1-acetyloxy-2-N,N-dimethylaminomethyl - 1 - (2 - pyridylmethyl)-1,2,3,4-tetrahydro-naphthalene maleate melts at 139–141° after recrystallization from a mixture of ethanol and diethyl ether.

What is claimed is:
1. A member selected from the group consisting of a compound of the formula

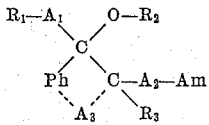

in which Ph is a member selected from the group consisting of 1,2-phenylene, (lower alkyl)-1,2-phenylene, (hydroxy) - 1,2 - phenylene, (lower alkoxy) - 1,2 - phenylene, (halogeno) - 1,2 - phenylene, and (trifluoromethyl)-1,2-phenylene, $R_1$ is a member selected from the group consisting of pyridyl, (lower alkyl)-pyridyl, (halogeno)-pyridyl and (lower alkoxy)-pyridyl, $R_2$ is the acyl group of a lower alkanoic acid, $R_3$ is a member selected from the group consisting of hydrogen and lower alkyl, Am is a tertiary amino group selected from the group consisting of N,N-di-lower alkyl-amino, N-cycloalkyl-N-lower alkyl-amino, in which cycloalkyl has from five to seven ring carbon atoms, N-lower alkyl-N-phenyl-lower alkyl-amino, N-hydroxy-lower alkyl-N-lower alkyl-amino, N,N-dihydroxy-lower alkyl-amino, 1-N,N-alkylene-imino, in which alkylene has from four to eight carbon atoms, 1-N,N-(N-lower alkyl-aza-alkylene)imino, in which alkylene has from four to six carbon atoms, 1-N,N-oxa-alkylene-imino, in which alkylene has four carbon atoms, and 1-N,N-thia-alkylene-imino, in which alkylene has four carbon atoms, and each of the groups $A_1$, $A_2$ and $A_3$ is lower alkylene, an acid addition salt thereof, an N-oxide thereof, an acid addition salt of an N-oxide thereof, a lower alkyl quaternary ammonium compound thereof and a phenyl-lower alkyl quaternary ammonium compound thereof.

2. A compound of the formula:

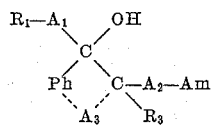

in which Ph is a member selected from the group consisting of 1,2-phenylene, (lower alkyl)-1,2-phenylene, (hydroxy) - 1,2 - phenylene, (lower alkoxy)-1,2-phenylene, (halogeno) - 1,2 - phenylene, and (trifluoromethyl)-1,2-phenylene, $R_1$ is a member selected from the group consisting of pyridyl, (lower alkyl)-pyridyl, (halogeno)-pyridyl and (lower alkoxy)-pyridyl, $R_3$ is a member selected from the group consisting of hydrogen and lower alkyl, Am is a tertiary amino group selected from the group consisting of N,N-di-lower alkyl-amino, N-cycloalkyl-N-lower alkyl-amino, in which cycloalkyl has from five to seven ring carbon atoms, N-lower alkyl-N-phenyl-lower alkyl-amino, N-hydroxy-lower alkyl-N-lower alkyl-amino, N,N - di - hydroxy - lower alkyl - amino, 1-N,N-alkylene-imino, in which alkylene has from four to eight carbon atoms, 1-N,N-(N-lower alkyl-aza-alkelene)imino, in which alkylene has from four to six carbon atoms, 1-N,N-oxa-alkylene-imino, in which alkylene has four carbon atoms, and 1-N,N-thia-alkylene-imino, in which alkylene has four carbon atoms, and each of the groups $A_1$, $A_2$ and $A_3$ is lower alkylene.

3. 2-N,N-di-lower alkyl-amino-methyl-1-lower alkanoyloxy-1-(pyridyl-methyl)-1,2,3,4-tetrahydro-naphthalene.

4. Pharmaceutically acceptable, non-toxic acid addition salts of 2-N,N-di-lower alkyl-amino-methyl-1-lower alkanoyloxy-1-(pyridyl-methyl)-1,2,3,4 - tetrahydro - naphthalene.

5. 1-acetyloxy - 2 - N,N - dimethylaminomethyl-1(2-pyridyl-methyl)-1,2,3,4-tetrahydro-naphthalene.

6. A pharmaceutically acceptable, non-toxic acid addition salt of 1-acetyloxy-2-N,N-dimethylaminomethyl-1-(2-pyridyl-methyl)-1,2,3,4-tetrahydro-naphthalene.

7. 1-acetyloxy - 2 - N,N - dimethylaminomethyl-1-(2-pyridyl-methyl)-1,2,3,4-tetrahydro-naphthalene maleate.

8. 2-N,N-dimethylaminomethyl - 1 - propionyloxy-1-(2-pyridyl-methyl)-1,2,3,4-tetrahydro-naphthalene.

9. A pharmaceutically acceptable, non-toxic acid addition salt of 2-N,N-dimethylaminomethyl-1-propionyloxy-1-(2-pyridyl-methyl)-1,2,3,4-tetrahydro-naphthalene.

10. 2-N,N-dimethylaminomethyl - 1 - propionyloxy-1-(2 - pyridyl-methyl) - 1,2,3,4 - tetrahydro - naphthalene maleate.

11. 2 - N,N-di-lower alkyl-amino-methyl-1-(pyridyl-methyl)-1,2,3,4-tetrahydro-naphthalen-1-ol.

12. 2 - N,N - dimethylaminomethyl - 1 - (2 - pyridyl-methyl)-1,2,3,4-tetrahydro-naphthalen-1-ol.

References Cited in the file of this patent

Groggins: Unit Processes in Organic Synthesis, pp. 597–599 (1952).

Kharasch et al.: Grignard Reactions of Nonmetallic Substances, pp. 138–145 (1954).